June 9, 1959

S. C. ROCKAFELLOW 2,890,432

APPARATUS AND METHOD FOR PRODUCING AND USING A VARIABLE CONDUCTIVE PATTERN

Filed Sept. 26, 1956

5 Sheets-Sheet 1

INVENTOR.
STUART C. ROCKAFELLOW
BY
Woodhams Blanchard and Flynn
ATTORNEYS

INVENTOR.
STUART C. ROCKAFELLOW
BY
Woodhams Blanchard & Flynn
ATTORNEYS

INVENTOR.
STUART C. ROCKAFELLOW
BY
Woodhams Blanchard & Flynn
ATTORNEYS

INVENTOR.
STUART C. ROCKAFELLOW
BY
Woodhams Blanchard & Flynn
ATTORNEYS

INVENTOR.
STUART C. ROCKAFELLOW
BY
Woodhams Blanchard & Flynn
ATTORNEYS

United States Patent Office 2,890,432
Patented June 9, 1959

2,890,432

APPARATUS AND METHOD FOR PRODUCING AND USING A VARIABLE CONDUCTIVE PATTERN

Stuart C. Rockafellow, Plymouth, Mich., assignor to Robotron Corporation, Detroit, Mich., a corporation of Michigan Application September 26, 1956, Serial No. 612,161
24 Claims. (Cl. 338—128)

This invention relates in general to apparatus and a method for producing, recording and using a plurality of patterns relating to a selected electrical characteristic for a portion of an electrical circuit, whereby the characteristic of said circuit may be varied quickly by replacing the record of one pattern with the record of another. More particularly, the invention relates to apparatus for, and a method of, selecting a desired value for a given variable characteristic, such as resistance, within a particular electrical circuit, after which the selecting device is used to produce an accurate record of said desired value for quick and easy reuse.

Persons familiar with electrical equipment, especially industrial production equipment, have long recognized the need for a simple, inexpensive means and method whereby the characteristics of a particular circuit can be quickly and easily changed, particularly by non-electrical personnel, in order to adapt the circuit to differing sets of operating conditions. Many attempts have been made to meet this problem, as by providing alternate leads and switching mechanism to effect changes in the selection of such leads. Where resistances must be varied, rheostats, variable resistors and switches, for example, are used for effecting the needed changes. However, operation and/or adjustment of these devices generally requires not only the attention of skilled personnel, but also a substantial period of time. This latter requirement is particularly serious since it necessitates shutting down the equipment with which said circuit is utilized during whatever time is required to effect the needed adjustments. Usually this setting, or resetting, will require several hours and, in such devices as multi-electrode, resistance welders, it often requires several days.

More specifically, reference may be made to electric welding equipment wherein the electronic control circuit for such equipment is provided with a plurality of variable resistances, each resistance being utilized to time the initiation, duration and/or termination of certain functions of the welding equipment. According to previous practices, the variable resistances in the control circuit must be manually and individually reset each time the timing of a particular function of the welding equipment corresponding to such resistance is changed. This generally occurs each time a different type of welding operation is to be performed by a particular machine. By way of example, the various functions in the operation of a welding machine may include the following: platen in time, squeeze time, forge delay time, preheat time, upslope time, weld time, weld heat time, downslope time, hold time, transfer time, platen delay time and off time.

Many of the present welding machines have ten or more welding functions, which must be changed and reset each time a different job is run on the machine. In many cases, and particularly in production work where automatic electric welding equipment is used, a particular type of job or welding operation may be performed several times. However, it is usually impractical to leave a particular welding machine set up with a single timing sequence until all possible demands for that particular sequence are completed. Thus, it becomes necessary for someone to reset the machine each time it is utilized to perform a different operation.

Under previous practices, substantially the same amount of time is required to reset the machine for an old timing sequence as is required initially to set the machine up for a new sequence. Such resetting not only wastes a considerable amount of time by requiring, in many instances, both the machine and the operator to remain idle while the resetting is being performed, but also often results in the loss of materials during the test runs of the machine after its resetting.

Thus, it can be readily seen that it would be extremely advantageous to provide a method and means whereby a permanent or substantially permanent record of a particular setting of the timing sequence, once set, could be permanently preserved and applied, even by unskilled personnel, upon repeated occasions of its use, together with means by which such a record could be used to reset a welding machine, or other equipment, quickly and accurately.

Accordingly, a primary object of this invention is the provision of a method and apparatus whereby the parameters and characteristics of an electrical circuit can be quickly and easily changed.

A further object of this invention is the provision of a method and apparatus, as aforesaid, whereby an element providing an electrical function, such as a resistance, may be accurately modified to produce correspondingly varying amounts of such electrical function.

A further object of this invention is the provision of a method and apparatus, as aforesaid, whereby the resistance settings for a plurality of variable resistances in a resistance-type timing circuit may be recorded and preserved, after they are once determined, for repeated and easy use at discontinuous intervals.

A further object of this invention is the provision of a method and apparatus, as aforesaid, which minimizes the time required for resetting the variable resistances of a resistance-type control circuit after such resistance settings have once been established accurately.

A further object of this invention is the provision of a method and apparatus, as aforesaid, whereby a replaceable pattern record of the setting of an electrical characteristic may be inexpensively and quickly produced by persons capable of selecting the setting initially, and which may then be used by any person capable of operating the machine for which the record has been created to reset the machine for subsequent use.

A further object of this invention is the provision of a method, as aforesaid, which may be carried out by relatively simple, inexpensive and easily operated equipment, and which may be carried out in a very short period of time.

A further object of this invention is the provision of apparatus, as aforesaid, which may be readily made applicable to a wide variety of electrical controlling characteristics, such as, but not limited to, resistance, variable inductance, phase shift, variable capacitance, and other adjustable characteristics of an electrical circuit.

A further object of this invention is the provision of a method and apparatus, as aforesaid, whereby records of selected circuitry settings may be made sufficiently quickly and inexpensively that it becomes feasible to prepare such a record of each setting of a given machine as a routine matter, and thereby eliminate the likelihood of a costly omission which might occur if the advisability of making such a record had to be decided by some individual in each respective instance.

A further object of this invention is the provision of a method, as aforesaid, wherein both the making of the record and its subsequent use are positive and mechanical and there is no room for human judgment and/or error.

Other objects and purposes of this invention will become apparent to persons familiar with this type of equipment upon reading the following specification and examining the accompanying drawings, in which.

Figure 4:
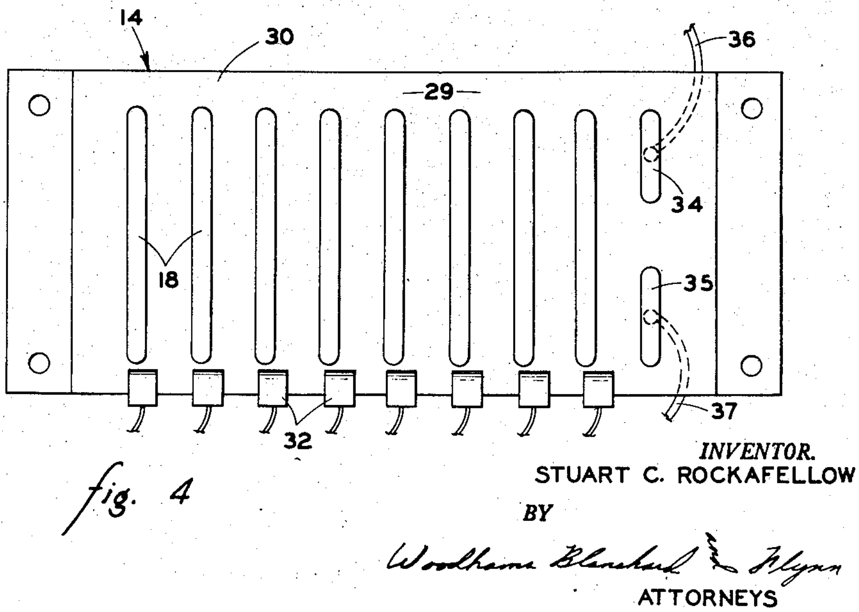
Figure 4 is a sectional view taken along the line IV—IV of Figure 1 and showing an elevational view of the resistance block.
Figure 6:
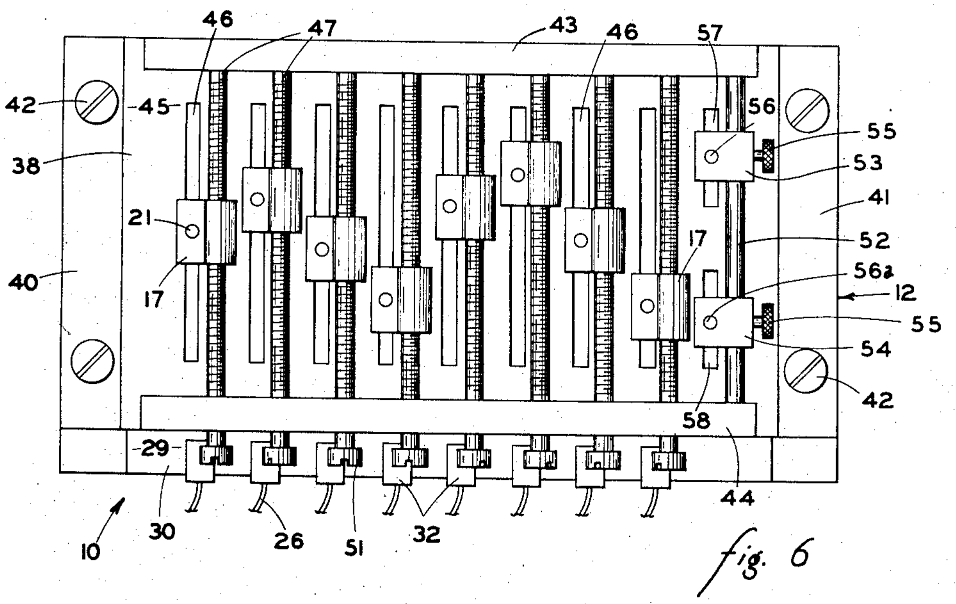
Figure 6 is a front elevational view of the selecting and recording device mounted upon the resistance support frame.

For the purpose of convenience in description, the terms "upper," "lower," "left," right," and derivatives thereof, will have reference to the structure and parts thereof as appearing in Figures 4 and 6. The terms "front," "rear," and derivatives thereof, will have reference to the bottom and top portions, respectively, of the structure as appearing in Figures 1 and 7. The terms "inner," "outer," and derivatives thereof, will have reference to the geometric center of the structures appearing in Figures 1, 7 and 9.

*General description*

Figure 3:
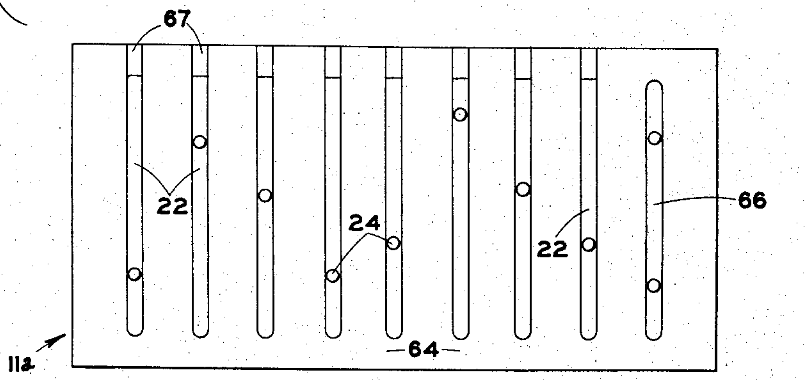
Figure 3 is a sectional view, substantially as taken along the line III—III of Figure 1, and showing the pattern record in elevation.

In order to meet the objects and purposes of this invention, there is provided an apparatus 10 for producing a pattern record 11 (Figures 1 and 3), physically marked or shaped so as to record the settings of a plurality of devices, such as adjustable resistances, by which an electrical function may be determined. The records may then be utilized subsequently to effect a resetting of said adjustable devices in precisely the same relative, and actual, settings as those which they occupied at the time the origial record was made. The invention further contemplates the provision of an apparatus 10, by which the records may be conveniently marked or shaped.

*Detailed construction of apparatus*

Although the invention lies as much in the method as in the apparatus herein disclosed, the method will be best understood when discussed in connection with apparatus for practicing same. Hence, attention will be directed first to a general consideration of such apparatus.

The pattern record 11 (Figure 3) comprises, in one preferred embodiment, a card or similar, easily handled, relatively stiff sheet carrying strips 22 of a conductive material, such as a soft metal, both of which can be readily deformed by a simple, hand operated means, but which, when once formed to a given shape, will not with ordinary care readily lose such shape. Before the distortion occurs, the card with the conductor thereon is hereinafter referred to as the "conductor-carrying member" 11*a* (Figure 9).

Figure 1:
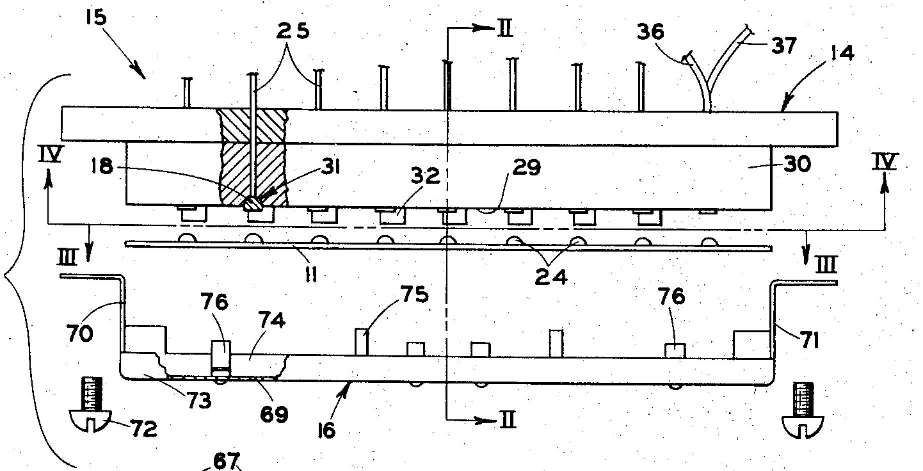
Figure 1 is an exploded, broken, top plan view of a structure embodying the invention.
Figure 7:
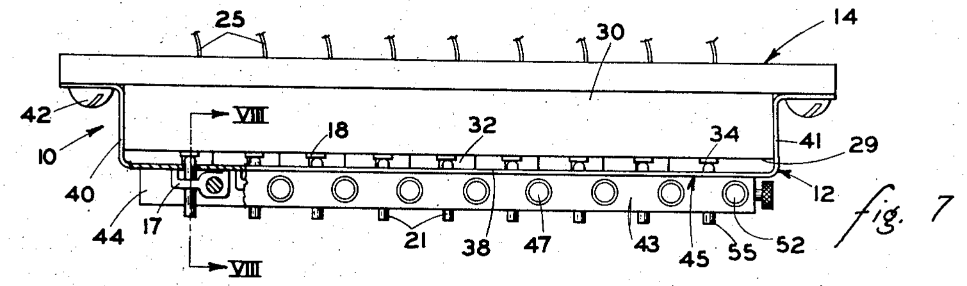
Figure 7 is a broken, top plan view of the structure shown in Figure 6.
Figures 8, 9, 10, 11, 19:
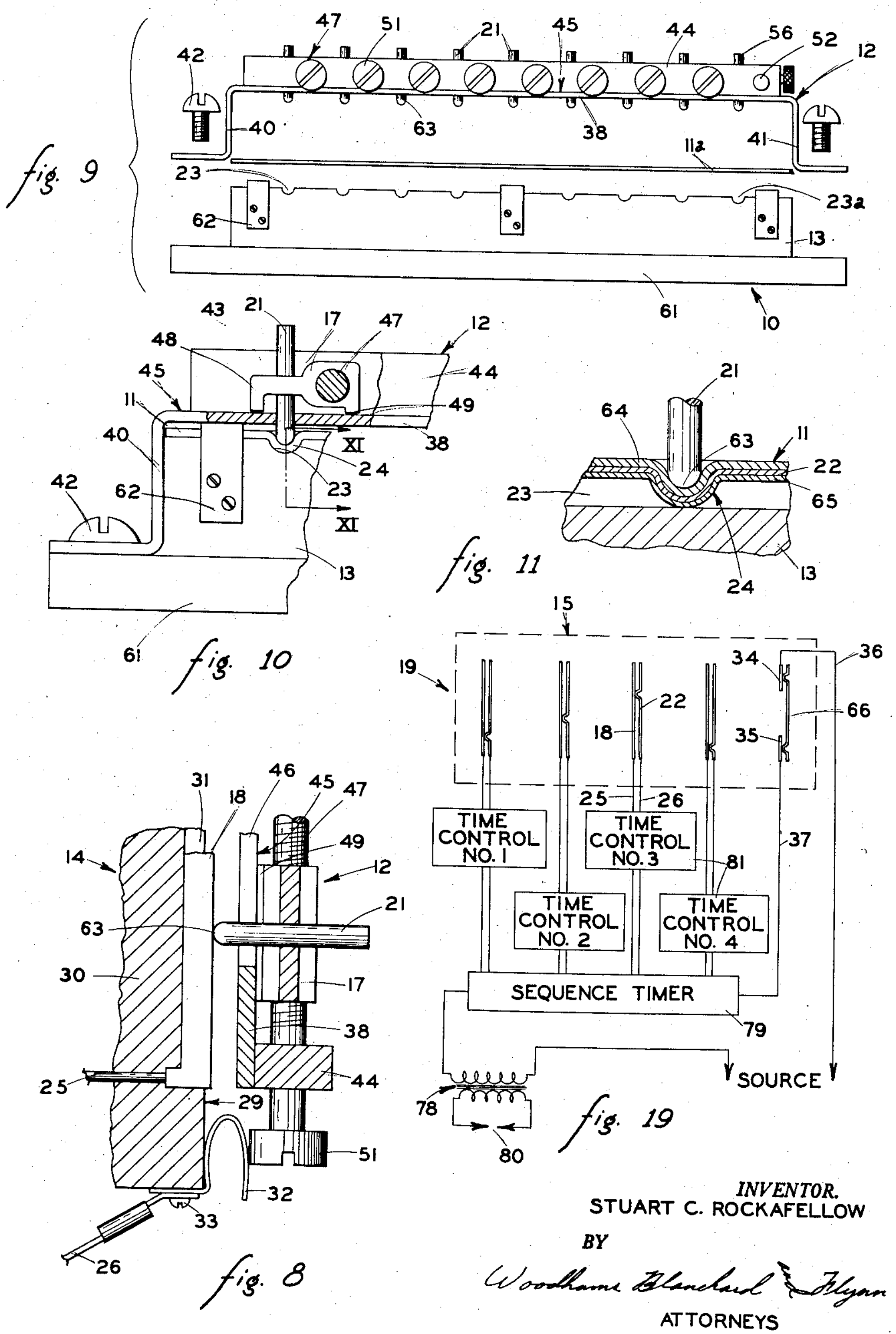
Figure 8 is a fragmentary, sectional view taken along the line VIII—VIII of Figure 7 and rotated 90° counterclockwise.
Figure 9 is an exploded, bottom view of the record producing apparatus, including the selecting and recording device and the punch block.
Figure 10 is a broken fragment of the structure shown in Figure 9, when said structure is in the assembled position.
Figure 11 is a sectional view taken along the line XI—XI of Figure 10.
Figure 19 is a circuit diagram illustrating a typical use of the invention.

The record producing apparatus 10, parts of which are shown in Figures 6, 7 and 9, is provided for converting a conductor carrying member 11*a* into a removable and replaceable pattern record 11 of the invention. Said apparatus 10 includes a selecting and recording device 12, a punch block 13 (Figure 9) and a resistance support frame 14 (Figures 1 and 7). The operational apparatus 15 (Figures 1, 2 and 4), with which said pattern record 11 may be used, includes the resistance support frame 14 and record holding device 16.

The selecting and recording device 12, which may be hereinafter referred to simply as the "selecting device," is mounted upon the resistance support frame 14 (Figure 7), after which the sliders 17 are positioned in selected, conductive engagement with conductive elements, such as the resistance elements 18 (Figure 4) on the resistance support frame 14, and adjusted to effect the desired resistances.

When the proper setting of said sliders 17 has been established and a conductor-carrying member 11*a* (Figure 9) is positioned upon the punch block 13, the selecting device 12 is removed from the resistance support frame 14 and then mounted upon said punch block 13. The contact rod 21 on each of the sliders 17 (Figure 10) will be aligned both with a conductive element 22 on the member 11*a* and a groove 23 in the punch block 13. Thus, when the outer ends of selected contact rods 21 are struck a light blow, as with a small mallet, the inner ends of said contact rods produce dimples 24 or other distortions in the otherwise smooth surface of the conductive elements 22 and the portions of the member 11*a* adjacent thereto.

Figures 2, 5, 14:
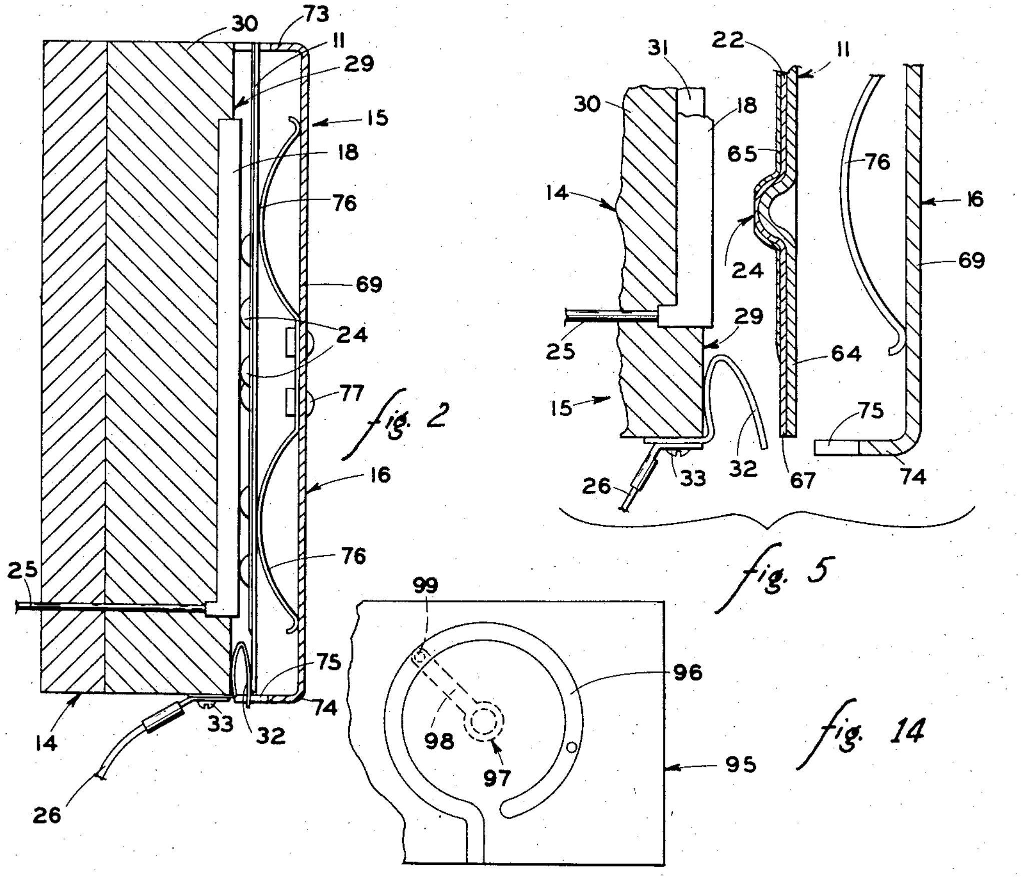
Figure 2 is an assembled, sectional view taken along the line II—II of Figure 1 and rotated 90° counterclockwise.
Figure 5 is an exploded fragment of the lower portion of the structure shown in Figure 2.
Figure 14 shows a further alternate structure for said pattern record.

The pattern record 11 thus formed is then removed from between the selecting device 12 and the punch block 13, and is placed in position between the resistance support frame 14 and the record holding device 16 (Figures 1 and 2). The dimples 24 produced by the contact rods 21 will engage the resistance elements 18 at the same points as said resistance elements were engaged by the contact rods 21. Suitable conductors 25 and 26 electrically connect the resistance elements 18 and conductive elements 22, respectively, to the electric circuit 19 (Figure 19) with which the operational apparatus 15 is associated.

Now, examining the apparatus in more detail, the resistance support frame 14 (Figures 1, 2 and 4) is comprised of a non-conductive mounting block 30, upon which a plurality of resistance elements 18 are supported. In this particular embodiment, the resistance elements 18 are disclosed as elongated strips of molded carbon pellets, imbedded in correspondingly elongated recesses 31 in the front surface 29 of the mounting block 30. Conductors 25 extend through the mounting block 30 and communicate with the recesses 31 for engaging conductively the resistance elements 18 therein. As shown in Figures 2 and 5, a plurality of flexible and resilient contact elements 32 are provided along the lower edge of the front surface 29 of the mounting block 30, one being located below each resistance element 18 and spaced therefrom. The conductors 26 are conductively engaged with the spring-type contact elements 32, as by means of screws 33, which support the contact elements 32 upon the mounting block 30.

As shown in Figure 4, the mounting block 30 may also support on its front surface 29 a pair of spaced, conductive strips 34 and 35, to which the conductors 36 and 37 are secured, respectively, and then extend through said mounting block 30. The strips 34 and 35 comprise part of a switch device, disclosed in detail hereinafter, whereby the flow of current through the circuit 19 (Figure 19) may be controlled.

As shown in Figures 6, 7 and 8, the selecting device 12 includes a flanged panel 38 having a pair of outwardly extending, L-shaped flanges 40 and 41 disposed along its lateral edges for the purpose of mounting said selecting device upon the resistance support frame 14 by means of the screws 42. A pair of elongated, parallel bearing blocks 43 and 44 are mounted upon the front surface 45 of the panel 38 adjacent to the upper and lower edges, respectively, thereof. Said panel 38 is provided with a plurality of elongated, spaced and parallel slots 46, which extend substantially between, and are preferably substantially perpendicular to, said bearing blocks 43 and 44, said slots opening completely through said panel 38. A plurality of screws 47, which are preferably parallel with each other, are rotatably supported at their upper and lower ends upon the bearing blocks 43 and 44, respectively. Said screws 47, which are equal in number to said slots, are arranged with one substantially adjacent to each of said slots 46. Sliders 17, which may be substantially identical, are threadedly mounted, one each, upon each of said screws 47, so that one portion of each slider 17 extends over the corresponding slot 46. A contact rod 21 extends through, and is supported upon, each slider 17 so that it extends through the corresponding slot 46 adjacent thereto. Said sliders 17 are provided with flanges 48 and 49 (Figure 10), which extend toward, and are spaced only for clearance purposes from, the front surface 45 of the panel 38. Each screw 47 has a head 51 of relatively large diameter at the lower end thereof, whereby said screws are rotated within said bearing blocks 43 and 44, thereby moving the sliders 17 supported thereon upwardly or downwardly therealong. The flanges 48 and 49 prevent rotation of the sliders with the screws 47.

In this particular embodiment, a rod 52 (Figure 6) is mounted upon, and between, the rightward ends of the bearing blocks 43 and 44, in a position substantially parallel with the screws 47. A pair of sliders 53 and 54 are slidably supported upon said rod 52 and are provided with set screws 55 for holding said sliders in fixed positions with respect to the rod 52. Said sliders are each provided with contact rods 56 and 56*a*, which extend through aligned slots 57 and 58, respectively, through the panel 38. The slots 46, 57 and 58 are arranged so that the contact rods 21, 56 and 56*a* (Figure 6) extending therethrough are aligned with the resistance elements 18 and the conductive strips 34 and 35 (Figure 4), respectively, when the selecting device 12 is mounted upon the resistance support frame 14.

The punch block 13 (Figures 9, 10 and 11), which has a back plate 61, is similar in size and shape to the mounting block 30 of the resistance support frame 14. Said punch block 13 is provided with a plurality of elongated, parallel and spaced grooves 23, which correspond in spacing, number and arrangement to the resistance elements 18 on the mounting block 30, as well as to the slots 46 in the panel 38. There is also an additional groove, indicated at 23*a*, which corresponds to the slots 57 and 58 in the panel 38. Thus, when the selecting device 12 is mounted upon the back plate 61 of the punch block 13, as shown in Figure 10, the rounded tips 63 of the contact rods 21 will be aligned, respectively, with, and extendable into, the several grooves.

The conductor-carrying member 11*a* (Figure 3), from which the pattern record 11 is formed, is comprised of a relatively stiff backing sheet 64, which is relatively thin and rectangular. Said backing sheet 64 supports a plurality of elongated, conductive elements 22 on its rear face, which are arranged in a manner corresponding to the arrangement of the resistance elements 18 on the mounting block 30. Said elements 22, each of which preferably extends from the lower edge of the backing sheet 64 to a point spaced from the upper edge of said sheet, may be in the form of conductors printed, or otherwise mounted, upon said backing sheet. A further conductive element 66 (Figure 3), which also may be of the printed variety, is mounted upon the backing sheet 64 and spaced from both the upper and lower edges thereof, for the purposes appearing hereinafter. The elements 22 and 66 are covered with insulation 65, which may be in the form of a non-conductive film, such as shellac, excepting only the ends 67 of the strips 22, which remain uncovered.

The record holding device 16 (Figures 1, 2 and 5) is comprised of a pressure panel 69 having a pair of L-shaped flanges 70 and 71, which extend along the opposite, lateral edges thereof, like the flanges 40 and 41 of the selecting device 12, for the purpose of mounting said holding device 16 upon the resistance support frame 14 by means of the screws 72. Said pressure panel 69, which is relatively stiff, may be provided with stiffening flanges 73 and 74 (Figure 2) along its upper and lower edges, respectively, for increasing the rigidity of said pressure panel 69. The lower stiffening flange 74 has several integral fingers 75, which extend toward, and are substantially coplanar with, the lower surface of the mounting block 30 when said holding device 16 is in assembled position with respect thereto. A pattern record 11 is inserted between the mounting block 30 and the holding device 16, and between the lateral flanges 70 and 71, as shown in Figures 2 and 5, until it engages said support fingers 75. Said flanges 70 and 71 and fingers 75 will provide for a positive and accurate positioning of a given record 11 with respect to the resistance support frame 14 in each and every instance of its insertion, thereby assuring identical performance of the associated circuit each time said given record is used. Thus, the conductive elements 22 on said record 11 will be aligned with the resistance elements 18 so that the dimples 24 can properly and conductively engage said resistance elements. Leaf springs 76 are mounted, as by means of the rivets 77 (Figures 1 and 5), upon the inner surface of the pressure panel 69 for the purpose of resiliently urging said record 11 against the mounting block 30 and thereby effecting conductive contact between the conductive elements 22 and the resistance elements 18 through the dimples 24, as well as between the lower, bared ends 67 of the conductive elements 22 and the spring elements 32.

The two dimples on the conductive element 66 (Figure 3) will engage the conductive strips 34 and 35 (Figure 4), respectively, thereby having the effect of connecting the strips together. As shown in Figure 19, this will close the circuit through the primary winding of the welding transformer 78 and the sequence timer 79. Thus, some function controlled by the circuit 19 (Figure 19), such as energization of the welding electrodes 80, will be performed as soon as the sequence timer 79 is operated by one of the time controls 81 connecting said resistance elements 18 to the timer 79.

*Method*

The method aspects of the invention may now be considered in connection with the use of the apparatus above described although it will be apparent as the description proceeds that other forms of apparatus can be used. A few alternate types of apparatus are described hereinafter for further illustrative purposes.

Under normal circumstances, the resistance support frame 14 (Figures 1 and 2) will be mounted upon, and will be a part of, the machine or other equipment, such as an electric welder, having the circuitry of which the resistance elements 18 are a part (Figure 19). Thus, conductors 25 and 26, as well as conductors 36 and 37, will be connected into the circuitry of said machine with said resistance elements 18 functioning as the variable resistance elements of such circuitry.

To effect the initial setup of the machine, that is, the adjustment of the proper amount of resistance to be obtained from each of the resistance elements 18, the screws 47 (Figure 6) are rotated, whereby the sliders 17 are moved in an axial direction along said screws until the desired amount of resistance is obtained from the corresponding resistance elements 18. The screw heads 51 conductively engage the contact springs 32 so that current can flow from the conductors 26 through the screws 47, sliders 17 and resistance elements 18 to the conductors 25 (Figure 1). The contact rods 56 and **56*a* on the sliders 53 and 54, respectively, combine with the support rod 52 to close the circuit between the conductive strips 34 and 35**.

The respective heads 51 of the several screws 47 are now selectively rotated to position the contacts of the several sliders 17 in such position along the resistance elements 18 as to provide a desired amount of resistance in each of said elements to bring about the desired function of the machine. Thus, for example, in a resistance welding device having a circuit 19 (Figure 19) wherein said resistance elements 18, acting through the time controls 81, control the timing of selected functions of the welding cycle, said sliders 17 are positioned so as to provide the desired amount of resistance between each of the respective conductors 25 and 26.

With said sliders 17 properly positioned, the apparatus is ready for converting a conductor-carrying member **11*a* into a suitable pattern record 11**, by which the particular setting then in effect can be readily and accurately reproduced, as desired, at a later time.

Accordingly, the selecting device 12 is removed from its mounting on the resistance support frame 14. A conductor-carrying member **11*a* is placed upon, and aligned with, the punch block 13 by placing said member 11*a* against the reference flanges 62, with the conductive elements 22 on the member 11*a* facing toward, and respectively aligned with, the grooves 23 in said punch block 13. The selecting device 12 is then mounted upon the back plate 61 (Figure 9) so that the panel 38 overlies both the member 11*a* and the punch block 13. The contact rods 21 on the sliders 17 will be contacting said member 11*a* on the opposite side thereof from said conductive elements 22 and the point of contact in each case will be aligned with an element 22 and a groove 23. The desired dimples 24, or similar distortions, are then provided in the conductive elements 22 by striking the outer, free ends of the contact elements 21, thereby causing the rod tips 63 to drive the adjacent portions of the conductive elements 22 into the grooves 23. After the desired dimples 24 are produced, the record 11 thus formed is removed from the selecting device 12 and the punch block 13. The record 11 thus provides a permanent record of the setting required to reproduce at any time the precise resistances used in a given set of circumstances to provide a desired operation. The selecting device 12 may now be removed from the back plate 61 of the punch block 13** for use elsewhere, if desired.

The tips of the dimples 24 are now engaged by an abrasive device to remove the insulating coating thereon and thereby expose the conductive elements 22 below said coating. Thus, each element having a dimple 24 is exposed conductively at said dimple, as well as at the lower end 67 thereof.

The record holding device 16 is now mounted upon the resistance support frame 14 with the support fingers 75 properly disposed adjacent to the lower edge of the mounting block 30. The record 11 is inserted between the mounting block 30 and the leaf springs 76 on the holding device 16, and also between the flanges 70 and 71 on the pressure panel 69, said record being moved downwardly until it engages said support fingers 75. The contact springs 32 will conductively engage the lower, exposed ends 67 of the conductive elements 22 and the conductive portions of the dimples 24 will conductively engage the resistance elements 18 at the desired distance from the conductors 25 and at the same points as originally determined and selected by adjustment of the sliders 17. The two dimples in the conductive element 66 will engage the conductive strips 34 and 35, respectively, thereby closing the circuit 19 (Figure 19) with which the resistance elements 18 are associated. Thus, the conductive element 66 and the dimples thereon act as a switch in which the conductive strips 34 and 35 are the terminals. Said switch is closed and opened by inserting and removing, respectively, the record 11 upon which the element 66 is mounted.

When the machine, such as a welding machine having welding electrodes 80 (Figure 19), with which the resistance support frame 14 is associated, is to be used for a different and new sequence of operations, the holding device 16 is removed from the frame 14 and replaced by the selecting device 12, which places the apparatus in condition for repeating the above outlined procedure. However, when it is desired to operate the machine in a sequence for which a record 11 has been made, it is no longer necessary to use the selecting device 12 for this operation. Instead, the holding device 16 remains on the frame 14 and the resistances of the resistance elements 18, hence, the sequence of operations, are changed simply by removing one record 11 from between the frame 14 and the holding device 16 and replacing it with another record 11.

*Alternate structures*

In Figures 12 to 18, alternate structures are shown which are capable of performing at least some portions of the method of the invention and are capable of attaining at least some of the objectives of the apparatus portion of the invention.

Figure 12:
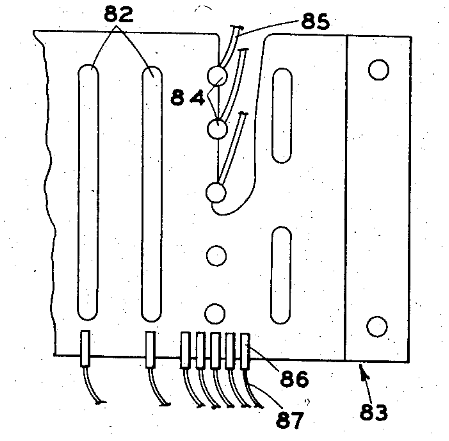
Figure 12 is a broken, front elevational view of a fragment of an alternate resistance support frame.
Figure 13:
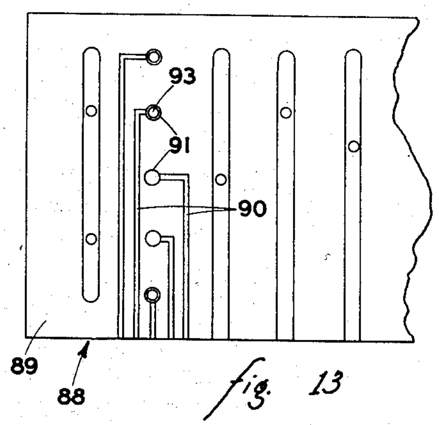
Figure 13 is a fragmentary, front elevational view of a pattern record for use with the alternate resistance support frame shown in Figure 12.

In Figure 12, there appears an alternate resistance support frame 83, which has, in addition to the resistance elements 82, a plurality of tap switch terminals 84, to which conductors 85 are connected. This frame 83 also has a plurality of spring-type contact elements 86 near its lower edge, one for each of said tap switch terminals 84, said spring-type contact elements being substantially similar to the contact springs 32 described hereinabove. Conductors 87 are connected to said contact springs 86.

An alternate pattern record 88 (Figure 13) is cooperable with the resistance frame 83 and has a backing sheet 89 with a plurality of conductive elements 90, which terminate at conductive spots 91. Said spots 91 are located, with respect to the lower edge of the sheet 89, to correspond to the location of the tap switch terminals 84 on the resistance support frame 83. The spots 91 are conductively connected to the tap switch terminals 84 by means of dimples 93 produced in said conductive spots 91 in substantially the same manner discussed hereinabove with respect to the structure disclosed in Figures 1, 3 and 9. Thus, when the record 88 is placed in operative position adjacent to the resistance frame 83, the dimples 93 will conductively engage the terminals 84, thereby connecting selected ones of the associated conductors 85 to corresponding ones of the conductors 87 through the conductive elements 90.

Figure 14 illustrates a modified pattern record 95 having a circular conductive element 96 and a selecting device, indicated in broken lines at 97, which includes a centrally pivoted arm 98 for locating, and then creating, a dimple 99 in the conductive element 96. This change in the shape of the conductive element 96 is accompanied by a corresponding change in the shape of the associated parts, such as the resistance elements (not shown), which are used therewith. Otherwise, the structure involved would be substantially the same as that described and discussed hereinabove with respect to Figures 1, 6 and 9. Operation of this form of apparatus will be substantially the same as set forth hereinabove with respect to the conductive elements 22 in the pattern record 11. The difference is one of shape, rather than substance.

Figure 15:
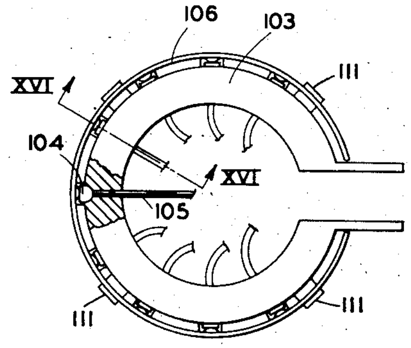
Figure 15 is a broken, top plan view of a substantially cylindrical, resistance support frame and pattern record therefor.
Figure 16:
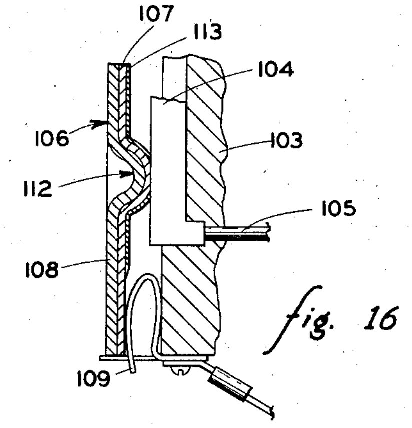
Figure 16 is a sectional view taken along the line XVI—XVI of Figure 15.

Figures 15 and 16 illustrate a hollow, cylindrical, resistance support block 103, wherein the resistance elements 104 are disposed in the periphery of the block 103, spaced from each other and substantially parallel with the central axis of said block. Conductors 105 conductively communicate with said resistance elements 104 in substantially the same manner as discussed hereinabove with respect to the conductors 25 and the resistance elements 18. A pattern record 106, which is cooperable with the resistance block 103, is also cylindrical and has a relatively rigid backing sheet 108 which supports conductive elements 107 along the inner surface thereof. By the very nature of its structure, the backing sheet 108 may be sufficiently stiff, yet flexible, to eliminate the need for any type of record holding device corresponding to the holding device 16 shown in Figures 1 and 2, the resilience and stiffness of the backing sheet 108 being relied upon to produce its own positioning. The spring contacts 109, like the spring contacts 32 shown in Figure 8, are mounted along the lower edge of the resistance block 103 for the purpose of conductively engaging the exposed, lower ends of the conductive elements 107. Flanges 111 may be provided on the lower edge of the block 103 for limiting the downward movement of the pattern record 106 and thereby accurately positioning said record with respect to the resistance block 103. Obviously, other methods of limiting and controlling the relative axial positions of the block 103 and the record 106 may be provided within the scope of this invention. As in the case of the pattern record 11, the dimples 112 on the record 106 conductively engage the resistance elements 104 after the insulating coating 113 is removed therefrom. Operation of this form of apparatus will also be substantially the same as that set forth above with respect to the conductive elements 22 in the pattern record 11. The difference is one of shape, rather than substance.

Figure 20:
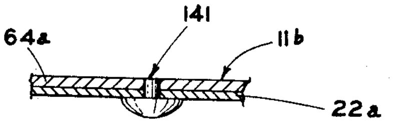
Figure 20 illustrates a further modification of the pattern record.

Figure 20 illustrates a modification 116 in the pattern record. Starting with a panel **64*a* and strips of distortable conductive material 22*a*, both similar to the corresponding parts 64 and 22 above described, the distortions 24 (Figure 11) effected by the rods 21 are drilled out and a contact button 141 is inserted in each opening so formed, with its flange firmly in contact with the conductive strip 22*a*. The entire panel may then be dipped in molten solder to fix the buttons 141 in place and insure a good electrically conductive contact between said buttons and the strips 22*a***. The whole assembly may then be coated with shellac, if desired, and the contact zones then bared, as before.

Figure 17:
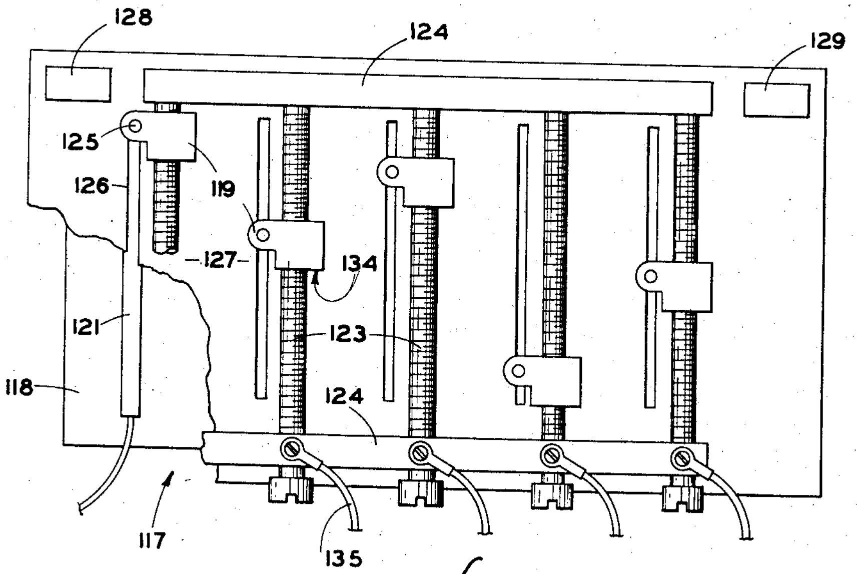
Figure 17 is a broken, front elevational view of an alternate structure for said selecting and recording device.
Figure 18:
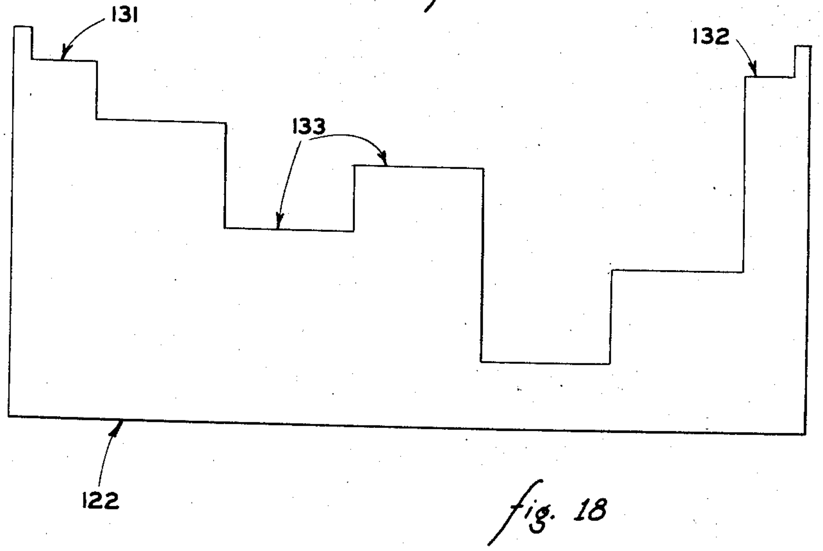
Figure 18 is a front elevational view of a record template which may be used with the selecting and recording device shown in Figure 17.

Figures 17 and 18 disclose a further alternate structure accomplishing at least some of the objects of the invention, but wherein the modified selecting device 117 remains on the resistance support frame 118. After the sliders 119 are adjusted with respect to the resistance elements 121 on the resistance frame 118, such adjustment is recorded upon a pattern record 122. Although this structure does not embody many of the narrower, more specific aspects of the invention, it does further illustrate the broad, generic concept. As in the case of the selecting device 12, the selecting device 117 includes a plurality of parallel screws 123, which are rotatably supported upon the bearing blocks 124 for threadedly engaging and supporting the sliders 119. Each slider is provided with a contact rod 125, which extends through a slot 126 in the panel 127, for conductive engagement with a said resistance element 121. A pair of reference posts 128 and 129 are mounted upon the panel 127 on opposite sides of the screws 123. The record 122 (Figure 18) has a pair of reference edges 131 and 132, respectively engageable with the posts 128 and 129. Positioning edges 133 are provided in the record 122 by notching said record between the reference edges 131 and 132. The positioning edges 133 are so located with reference to the reference edges 131 and 132 that they will engage the lower edges 134 of the sliders 119 when said sliders are properly adjusted and said reference edges are in engagement with said reference posts. The positioning of the sliders 119 upon the screws 123 may be effected by rotating the screws 123 in substantially the same manner as set forth hereinabove with respect to the corresponding parts of the selecting device 12. Conductors 135 are provided to conductively communicate continuously, one with each screw 123, hence, with the resistance element 121 through the contact rod 125 and corresponding slider 119.

While the sliders 119 will be manually repositioned each time the setting is changed, the pattern record 122 (Figure 18) will permit accurate, easy and speedy adjustment of said sliders 119 at any time after the initial setting, at which time the pattern record 122 is cut. To effect such adjustment, the reference edges 131 and 132 are placed against the reference posts 128 and 129, after which the screws 123 are rotated until the lower edges of the sliders 119 engage the respective positioning edges 133 of the record 122. After the sliders 119 are thus adjusted, the record 122 may be removed and the apparatus with which the resistance elements 121 are associated is ready for immediate operation.

Although several, preferred embodiments of the invention have been disclosed in detail hereinabove for illustrative purposes, it will be understood that variations and modifications thereof, which lie within the scope of such disclosure, are fully contemplated unless specifically stated to the contrary in the appended claims.

I claim:

1. A variable resistance comprising: a resistance element having a conductive surface; a first conductor connected to said resistance element; a plurality of selector conductors, similar to each other and each having a surface similar in contour to said conductive surface, each selector conductor having a protuberance extending from said similar surface; and means for removably supporting a selected one of said selector conductors in a selected position adjacent to said resistance element with only said protuberance in conductive contact with said element, a second conductor connected to said selected one of said selector conductors whereby said resistance element and said selected one of said selector conductors are serially connected in circuit between said first and said second conductors.

2. The structure of claim 1 wherein said selector conductors are strips of conductive substance mounted upon sheet material, and each of said protuberances is a small portion of said strip which is displaced laterally of said contour.

3. The structure of claim 1 wherein each conductor is held by said supporting means in substantially the same position with respect to said element.

4. Apparatus for changing the timing of a multi-function control circuit, comprising: a base member having a plurality of resistance elements disposed along one side thereof; a plurality of first conductors, each of said first conductors being connected to one of said resistance elements; a plurality of control panels, similar to each other and each having a plurality of conductors disposed along one surface thereof, at least part of the conductors on each panel each having a protuberance therein between the ends thereof; and means for removably supporting a given one of said panels adjacent and opposed to said member in a selected position with only said protuberances being contiguous with respective ones of said elements; a plurality of second conductors, each of said second conductors being connected to one of said panel conductors on said given panel whereby each of said resistances is connected in series with one of said panel conductors between said first and said second conductors.

5. The structure of claim 4 wherein the conductors are arranged on each panel for substantially identical alignment with the respective elements.

6. The structure of claim 4 wherein said base has a plurality of terminals on said side and at least some of said panels have contact points on said surface which are conductively engageable with said terminals when said panels are in said position.

7. A method of producing a removable, conductive, pattern selector for a circuit having a plurality of resistance elements arranged in relatively close and fixed positions with respect to each other, the steps including: arranging a plurality of conductors in relatively fixed positions upon a support member, the relative positions of said conductors corresponding closely to the relative positions of said resistances; marking at least some of said conductors at respectively selected points on each, and forming a protuberance at each of said points, the said protuberances on said conductors being simultaneously and conductively engagable with the corresponding resistances, respectively, when said member is in a selected position with respect to said resistances.

8. A method of producing a removable, conductive, pattern selector for a multi-function control circuit having a plurality of resistance elements arranged in relatively close and fixed positions with respect to each other, the steps including: arranging a plurality of conductors in relatively fixed positions upon a support member, the relative positions of said conductors corresponding closely to the relative positions of said resistances; manually arranging a plurality of contacts respectively on each of said resistance elements to determine the desired value of the resistances for said control circuit; marking at least some of said conductors at respectively selected points on each, said points corresponding to the positions of said respective contacts and said points being simultaneously and conductively engagable with the corresponding resistances, respectively, when said member is in a selected position with respect to said resistances at points on said several resistances corresponding to the points on said resistances contacted by said manually adjusted contacts.

9. A method of varying the resistances of a plurality of resistance elements, the steps comprising: arranging said elements in close, fixed positions with respect to each other; arranging at least two separate groups of conductors in similar patterns, the relative positions of the conductors in each pattern corresponding to the positions of said elements; distorting at least some of the conductors in each group at points thereon, and presenting said groups, one at a time, to a selected position adjacent to said elements, said distorted points in each group being simultaneously and conductively engageable with said elements when said each group is in said selected position.

10. A method of forming a variable timer for an electrical device wherein such timing depends upon the point of contact between a pair of conductive members, the steps comprising: fixing a reference point with respect to one of said members; manually selecting a plurality of contact points with respect to said one member; providing a plurality of selector templates removably disposable, one at a time, in a selected position with respect to said reference point; and locating indicia on each of said templates for positioning the other member to conductively engage said one member at a selected one of said contact points when said templates are in said selected position.

11. A method for varying the conductive pattern of a multi-function control circuit, the steps comprising: arranging a plurality of conductive elements in fixed positions of relatively close proximity with respect to each other; connecting said elements to said circuit; arranging a plurality of separate groups of conductors in similar patterns, the conductors in each group being in fixed positions with respect to each other, and the relative positions of each group of conductors corresponding closely to the relative positions of said elements; distorting at least some of said conductors in each group at points thereon; and presenting one of said groups at a time to a selected position adjacent to said elements, said distorted points being simultaneously and conductively engageable with the corresponding elements when said one group is in said selected position.

12. A method for fixing the value of a resistance element at a predeterminable amount, the steps comprising: arranging said element for conductive engagement; mounting a first conductor in conductive engagement with said element at a point thereon; adjusting said point of engagement to provide said value; arranging a second conductor on a support device; utilizing said first conductor to distort said second conductor at a point; and presenting said second conductor to a selected position wherein said distorted point will engage said element at said adjusted point thereon.

13. A method of producing a variable resistance, the steps including: providing a resistance element with an exposed surface; causing a conductive member to engage said surface at a plurality of selected points representing different values of resistance; providing a plurality of conductors, similar to each other; causing said member to distort said conductors at a point on each corresponding to one of said points on said surface; presenting said conductors, one at a time, to a selected position with respect to said conductive member, said distorted points being in conductive engagement with said surface at said selected points, respectively.

14. In apparatus for changing the conductive pattern of an electrical circuit having an exposed, regular, conductive surface, the combination comprising: a backing sheet having one side closely conforming to the contour of said surface; at least one elongated, conductive element on said one side of said sheet; a distortion in said element intermediate the ends thereof and extending laterally from said side; and insulating material covering said conductive element on both sides of said distortion, said distortion being exposed for conductive engagement with said surface.

15. A pattern device for selecting a predetermined characteristic in an electrical circuit comprising: a backing sheet having a smooth, regular surface; a plurality of elongated spaced, conductive elements arranged on said surface; protuberances respectively extending from at least some of said elements intermediate the ends thereof, each protuberance extending laterally from said surface; means insulating said conductive elements on opposite sides of said protuberances, said protuberances being electrically exposed.

16. A device for conductively engaging a plurality of spaced, elongated exposed and conductive elements mounted upon a frame, comprising: a support panel having a plurality of elongated openings therethrough arranged for simultaneous alignment with said elements; means for mounting said panel upon said frame while maintaining said alignment; a plurality of sliders and conductive means adjustably supporting said sliders with respect to said panel for movement along, and respectively adjacent to, said openings; contact means on each slider extending through its respective opening; and a plurality of conductors mounted upon said frame and conductively connected, respectively, with said conductive means, said panel being non-conductive with respect to said contact means and said conductors.

17. Apparatus for producing a lateral distortion at a selected point in an elongated, conductive element mounted upon a backing sheet, comprising: a block having an elongated grove in one face thereof and corrseponding in shape to said element; a support panel having an elongated opening therethrough and arranged for alignment with said groove; means for mounting said panel upon said block while maintaining said alignment; a slider and means adjustably supporting said slider upon said panel for movement along said opening; a contact element secured to and extending through said slider and said opening, one end of said contact element being receivable into said groove when said panel is mounted upon said block for effecting said distortion in a said conductive element disposed between said groove and said opening.

18. An apparatus for determining a characteristic of an electrical circuit, including: a mounting member of electrical insulating material, said mounting member having a plurality of elongated circuit elements secured thereto and arranged in a predetermined pattern thereon and electrically insulated from each other; a pattern record member of electrical insulating material, said pattern record member having a plurality of conductive elements mounted thereon and arranged in the same pattern as the circuit elements on said mounting member, said conductive elements being electrically insulated from each other; means defining a contact on each of said conductive elements, each of said contacts being in conductive engagement with one of said circuit elements at only one point therealong; a conductor electrically connected to each of said circuit elements adjacent one end thereof, a second conductor electrically connected to each of said conductive elements; and means for supporting said pattern record member in fixed position with respect to said mounting member with the contacts of said conductive elements at a location spaced from said point thereon being in conductive engagement, respectively, with said circuit elements whereby each of said circuit elements is connected in series with one of said conductive elements between said first and second conductors.

19. An apparatus for determining a characteristic of an electrical circuit, including: a mounting member having a plurality of circuit elements secured thereto and electrically insulated therefrom and with respect to each other, said circuit elements being arranged in a predetermined pattern thereon; a manually adjustable means on each of said circuit elements for determining the value thereof; a pattern record sheet having a positioning edge formed thereon for each of said circuit elements, said positioning edges being adapted to overlie said circuit elements to indicate the correct position of said manually adjustable means to provide the desired value of each of said circuit elements; and means for locating said pattern record sheet in fixed position opposed to and adjacent said mounting member.

20. An apparatus for determining a characteristic of an electrical circuit, including: a mounting block having a planar surface; a plurality of elongated, parallel resistance elements secured to said surface and electrically insulated from each other and from said block; a pattern record sheet of insulating material having a plurality of elongated parallel conductive elements mounted on one surface thereof and arranged in the same pattern as said resistance elements, each of said conductive elements having a contact thereon engaged with one of said resistance elements at only one point thereon; a set of first conductors on said mounting block and means connecting each of said first conductors to one of said resistance elements adjacent one end thereof; a set of second conductors on said mounting block, each of said second conductors having a contact element thereon; a contact element on each of said conductive elements adjacent one end thereof and engageable with a corresponding contact element on said mounting block; a sheet holding device secured to said mounting block and spaced therefrom whereby said pattern record sheet is held thereby adjacent said mounting block; resilient means on said sheet holding device urging the contacts and contact elements on said sheet into engagement with said resistance elements and contact elements on said mounting block, respectively.

21. An apparatus for determining a characteristic of an electrical circuit, including: a mounting member of electrical insulating material; said mounting member having a plurality of elongated circuit elements secured to one surface and arranged in a predetermined pattern thereon and electrically insulated from each other; a pattern record member of electrical insulating material, said pattern record member having a plurality of elongated conductive elements mounted on one surface thereof and arranged in the same pattern as the circuit elements on said mounting member, said conductive elements being electrically insulated from each other; means defining a contact on each of said conductive elements intermediate the ends thereof, each of said contacts being in conductive engagement with one of said circuit elements at only one point thereon; a first conductor electrically connected to each of said circuit elements adjacent one end thereof; a plurality of second conductors on said mounting member, each of said second conductors having a contact element thereon; a contact element on each of said conductive elements adjacent one end thereof and engagable with a corresponding contact element on one of said second conductors; a sheet holding device mounted in fixed position with respect to said mounting member and spaced from said one surface of said mounting member, said pattern record member being supported on said device between said device and said one surface of said mounting member with said one surface on said pattern record member being opposed to said one surface of said mounting member; spring means on said device urging said pattern record member toward said one surface of said member whereby said contact and contact element on each of said conductive elements are urged, respectively, into contact with one of said circuit elements and a contact element of a second conductor.

22. A method for adjusting a selected characteristic of an electrical circuit, wherein said characteristic is determined by the values of a plurality of circuit elements, including the steps: adjusting the values of said circuit elements so that said characteristic is of the desired effect; preparing a pattern record of such adjustment utilizing the positioning of the controls determining the values of said circuit elements so that the contour of said record pattern bears a predetermined relationship to the physical positioning of said controls; and subsequently utilizing said pattern record to reproduce the desired adjustment of the values of said circuit elements.

23. A method for adjusting a selected characteristic of an electrical circuit, wherein said characteristic is determined by the values of a plurality of circuit elements, including the steps: moving value-determining control elements on said circuit elements to positions wherein the values of said circuit elements are such that said characteristic is of the desired effect and thereafter locking such control elements in such positions; applying said control elements to a record pattern and locating indicia thereon by means of said control elements so that said indicia are positioned on said pattern record in an arrangement corresponding to the positioning of said control elements; and thereafter applying said record pattern to said circuit elements so that the indicia corresponding to the position of a control element on a selected circuit element occupies the same position on said selected circuit element and determines the value therof so that said pattern record determines the values of said circuit elements to provide a substantially identical characteristic for said circuit.

24. A method for determining a selected resistance pattern for an electrical circuit utilizing a plurality of variable resistances, including the step: moving value-determining control elements on said resistances to positions wherein the values of said resistances are of the desired amount; forming indicia on a record pattern so that said indicia are located on said record pattern in an arrangement corresponding to the positioning of said control elements; and thereafter applying said record pattern to said resistances so that said indicia contact said resistances at the same points as did said control elements and thereby determine the value of said resistances to provide a substantially identical resistance pattern for said circuit.

References Cited in the file of this patent

UNITED STATES PATENTS

| | | |
|---|---|---|
| 1,972,289 | Chauveau | Sept. 4, 1934 |
| 2,353,061 | Oldenboom | July 4, 1944 |
| 2,493,848 | Ayres | Jan. 10, 1950 |
| 2,502,960 | Johnson | Apr. 4, 1950 |
| 2,525,837 | Simplair | Oct. 17, 1950 |
| 2,557,022 | Wolowitz | June 12, 1951 |
| 2,598,155 | Betts | May 27, 1952 |
| 2,613,287 | Geiger | Oct. 7, 1952 |
| 2,777,925 | Stolz | Jan. 15, 1957 |

UNITED STATES PATENT OFFICE

CERTIFICATE OF CORRECTION

Patent No. 2,890,432 June 9, 1959

Stuart C. Rockafellow

It is hereby certified that error appears in the printed specification of the above numbered patent requiring correction and that the said Letters Patent should read as corrected below.

Column 13, line 24, strike out "said slider and"; lines 50 and 51, strike out "at a location spaced from said point thereon" and insert the same after "elements" and before the semicolon in line 47, same column.

Signed and sealed this 3rd day of November 1959.

(SEAL)
Attest:

KARL H. AXLINE
Attesting Officer

ROBERT C. WATSON
Commissioner of Patents